US010626224B2

(12) United States Patent
Chintapalli et al.

(10) Patent No.: US 10,626,224 B2
(45) Date of Patent: Apr. 21, 2020

(54) METHOD TO PRODUCE TRANSPARENT POLYMER AEROGELS USING CHAIN TRANSFER AGENTS (71) Applicants: PALO ALTO RESEARCH CENTER INCORPORATED, Palo Alto, CA (US); XEROX CORPORATION, Norwalk, CT (US)

(72) Inventors: Mahati Chintapalli, Mountain View, CA (US); Barkev Keoshkerian, Thornhill (CA); Gabriel Iftime, Dublin, CA (US); Quentin Van Overmeere, Mountain View, CA (US)

(73) Assignees: PALO ALTO RESEARCH CENTER INCORPORATED, Palo Alto, CA (US); XEROX CORPORATION, Norwalk, CT (US)

( * ) Notice: Subject to any disclaimer, the term of this patent is extended or adjusted under 35 U.S.C. 154(b) by 123 days.

(21) Appl. No.: 15/728,385

(22) Filed: Oct. 9, 2017

(65) Prior Publication Data
US 2019/0106543 A1    Apr. 11, 2019

(51) Int. Cl.
*C08J 9/28*      (2006.01)
*C08G 77/442*    (2006.01)
*C01B 33/158*    (2006.01)
*C08F 2/48*      (2006.01)
*C08L 33/08*     (2006.01)
(Continued)

(52) U.S. Cl.
CPC ........ *C08G 77/442* (2013.01); *C01B 33/1585* (2013.01); *C08F 2/38* (2013.01);
(Continued)

(58) Field of Classification Search
CPC ............ C08J 2205/026; C08J 2205/028; C08J 3/075; C08J 9/28; C08F 2/38; C08F 2/48; C08F 220/00
See application file for complete search history.

(56) References Cited

U.S. PATENT DOCUMENTS 5,723,554 A    3/1998  Fujita
5,795,557 A    8/1998  Pajonk et al.
(Continued)

FOREIGN PATENT DOCUMENTS

WO      9946310 A1      9/1999
WO      2010080238 A3   7/2010

OTHER PUBLICATIONS

Zhang, et al. Polymer Nanofibers with Outstanding Thermal Conductivity and Thermal Stability: Fundamental Linkage Between Molecular Characteristics and Macroscopic Thermal Properties, Journal of Physical Chemistry C 2014 118:36, pp. 21148-21159.
(Continued)

*Primary Examiner* — Kara B Boyle
(74) *Attorney, Agent, or Firm* — Miller Nash Graham & Dunn LLP (57) ABSTRACT A method of producing a transparent polymer aerogel can include dissolving gel precursors consisting of radical polymerizable monomers and crosslinkers, radical initiators, and a chain transfer agent (CTA) in a reaction solvent, placing the gel precursors into a substrate, polymerizing the gel on the substrate, optionally removing the wet gel from the mold, optionally performing at least one solvent exchange on the gel, and drying the solvent-exchanged gel.

20 Claims, 11 Drawing Sheets (51) Int. Cl.
<table>
<tr><td>C08J 11/22</td><td>(2006.01)</td></tr>
<tr><td>C08J 3/24</td><td>(2006.01)</td></tr>
<tr><td>C08K 5/37</td><td>(2006.01)</td></tr>
<tr><td>C08L 33/10</td><td>(2006.01)</td></tr>
<tr><td>C08F 2/38</td><td>(2006.01)</td></tr>
<tr><td>C08J 3/075</td><td>(2006.01)</td></tr>
<tr><td>C08F 220/14</td><td>(2006.01)</td></tr>
<tr><td>C08F 220/18</td><td>(2006.01)</td></tr>
<tr><td>C08F 222/10</td><td>(2006.01)</td></tr>
<tr><td>C08F 212/36</td><td>(2006.01)</td></tr>
</table>

(52) U.S. Cl.
CPC .............. *C08F 2/48* (2013.01); *C08F 220/14* (2013.01); *C08F 220/18* (2013.01); *C08J 3/075* (2013.01); *C08J 3/246* (2013.01); *C08J 9/28* (2013.01); *C08J 11/22* (2013.01); *C08K 5/37* (2013.01); *C08L 33/08* (2013.01); *C08L 33/10* (2013.01); *C08F 212/36* (2013.01); *C08F 2222/104* (2013.01); *C08F 2222/1013* (2013.01); *C08F 2222/1026* (2013.01); *C08J 2201/0502* (2013.01); *C08J 2205/026* (2013.01); *C08J 2333/04* (2013.01); *C08J 2347/00* (2013.01)

(56) References Cited

U.S. PATENT DOCUMENTS

<table>
<tr><td>6,713,584 B1</td><td></td><td>3/2004</td><td>Chisholm et al.</td><td></td></tr>
<tr><td>7,732,496 B1 *</td><td></td><td>6/2010</td><td>Leventis</td><td>C04B 35/14<br>423/335</td></tr>
<tr><td>8,663,742 B2 *</td><td></td><td>3/2014</td><td>Kissel</td><td>C09D 7/62<br>427/387</td></tr>
<tr><td>2003/0013822 A1</td><td></td><td>1/2003</td><td>Chisholm et al.</td><td></td></tr>
<tr><td>2004/0063880 A1</td><td></td><td>4/2004</td><td>Chisholm et al.</td><td></td></tr>
<tr><td>2010/0163157 A1</td><td></td><td>7/2010</td><td>Mulburn</td><td></td></tr>
<tr><td>2011/0237692 A1</td><td></td><td>9/2011</td><td>Wu et al.</td><td></td></tr>
<tr><td>2011/0311802 A1 *</td><td></td><td>12/2011</td><td>Cho</td><td>B01J 13/0091<br>428/316.6</td></tr>
<tr><td>2014/0065329 A1 *</td><td></td><td>3/2014</td><td>Showers</td><td>E06B 3/6715<br>428/34</td></tr>
<tr><td>2014/0080934 A1</td><td></td><td>3/2014</td><td>Wu et al.</td><td></td></tr>
<tr><td>2018/0093456 A1</td><td></td><td>4/2018</td><td>Van Overmeere et al.</td><td></td></tr>
</table>

OTHER PUBLICATIONS

Jenkins et a. "Terminology for reversible-deactivation radical polymerization previously called 'controlled' radical or living' radical polymerization (IUPAC Recommendations 2010," Pure Applied Chemistry, vol. 82, No. 2, pp. 483-491, 2010.

Belmares et al., "Hildebrand and Hansen Solubility Parameters from Molecular Dynamics with Applications to Electronic Nose Polymer Sensor Polymers," Wiley Periodicals 2004.

Graeme Mood et al., "A Micro Review of Reversible Addition/Fragmentation Chain Transfer (RAFT) Polymerization," Sigma-Aldrich, 8 pages.

Sebastien Perrier, "50th Anniversary Perspective: RAFT Polymerization—A User Guide," Macromolecules 2017, 50, pp. 7433-7447.

Vivek Mishra, "Living Radical Polymerization—A Review," Journal of Scientific Research, vol. 56, 2012 pp. 141-176.

* cited by examiner

FIG. 1A $P + RX \rightarrow PX + R$
$R + nM \rightarrow P_1$
$R + PX \rightarrow P$

STYRENE

DIVINYLBENZENE

FIG. 3A    FIG. 3B

1,6-HEXANEDIOL DIACRYLATE

FIG. 3C

METHYLMETHACRYLATE

FIG. 3D

TRIMETHACRYLADAMANTANE

FIG. 4A

DIPENTERITHRITOL PENTACRYLATE

FIG. 4B

TRIMETHYLOLPROPANE
TRIMETHACRYLATE

FIG. 4C

POLYOLIGOSILSEQUIOXANE
OCTAMETHACRYLATE

FIG. 4D

CCl₄

METHOD TO PRODUCE TRANSPARENT POLYMER AEROGELS USING CHAIN TRANSFER AGENTS

GOVERNMENT FUNDING

This invention was made with U.S. Government support through Contract DE-AR0000734 ARPAE-SHIELD-Aerogel, which began on Jun. 16, 2016. The Government has certain rights in this invention.

TECHNICAL FIELD

This disclosure relates to transparent polymer aerogels, and more particularly to producing transparent polymer aerogels using chain transfer agents.

BACKGROUND

Windows are important and high-cost components of the exterior of a building. By reducing heat loss through single pane windows, domestic energy consumption in the United States can be reduced by an estimated 1.3%. Heat loss in windows can be decreased by increasing the thermal insulation of a window, which is commonly described by the U-factor (i.e., BTU $ft^{-2}$ $h^{-1\circ}$ $F.^{-1}$).

Present attempts to reduce heat loss through single pane windows include replacing them with double-paned insulated glass units (IGUs), which can incorporate inert gas insulation and/or low-emissivity coatings. While IGUs are generally effective at reducing heat loss, they are prohibitively expensive for retrofitting existing single pane windows (e.g., $50-100/ft^2$) because IGU installation requires the replacement of the window framing and sash, in addition to the pane.

In addition, IGUs are significantly heavier than single pane windows and they change the appearance of the window, both of which are factors that prevent their adoption for single pane window retrofits. Thus, the need exists for inexpensive, highly-insulating, transparent films or manufactured panes that can be retrofitted to single pane windows.

Optical transparency and low haze are generally of primary importance for window materials. High-thermal insulation and high-transparency are difficult to achieve simultaneously in a material. High porosity increases thermal insulation by reducing the amount of solid, high-thermal conductivity material, and disrupting convective heat transfer; however, pores that are above ~10 nanometers scatter visible light, thus increasing the haze and decreasing the transparency of the material.

Many highly-insulating materials such as fiberglass, polyurethane foams, and silica aerogels are porous but opaque or translucent, thus rendering them unsuitable for window applications. For insulation materials to be transparent, porosity must be controlled and on the nanometer-length scale.

Conventional radical polymerization produces polymer gels with a large range of pore sizes, including some that are very large. This results in hazy and often white, opaque gels.

At the present time, there is no available process for fabrication of high surface area all-polymer aerogels dried by ambient solvent evaporation. Supercritical CO2 dried polyimide (PI) aerogels with a BET surface areas of up to about 500 m2/g have been reported. Supercritical drying prevents shrinkage and pore collapse by preventing the solvent from undergoing a direct liquid-to-vapor transition. However, supercritical drying is expensive, slow, and hazardous due to the high pressure required, and it is therefore not desirable for fabrication of large area (e.g., >15 sq. ft.) and for high-throughput manufacturing. Ambient drying is a key requirement for achieving low cost aerogel films.

As used herein, the term ambient drying generally refers to any process that results in direct solvent evaporation of the solvent, starting from a liquid in the gel into a vapor, and note that the applied air pressure and temperature may be different from that of the ambient air. Other alternatives to supercritical drying and ambient drying such as freeze drying also result in higher costs compared to ambient drying.

A challenge is that commercial ambient air dried PI aerogels have a much lower surface area, typically BET <100 m2/g. This is due to shrinking of the polymer network as a result of the capillary pressure arising during solvent exchange and/or drying in ambient conditions. Several properties require BET area >100 m2/g. For instance, achieving very low thermal conductivity requires high BET areas because high BET areas are generally due to high porosity and small pore sizes. This decreases the fraction of thermal conductivity transport through the aerogel skeleton, and pores smaller than the mean free path of the ambient gas (e.g. air) leading to the Knudsen effect, where the thermal conductivity can decrease below that of the ambient gas (e.g., air at 0.025 W/m K in typical conditions).

An even more challenging problem is related to the fabrication of low haze transparent polymer aerogels. PI aerogels are colored deep yellow and are opaque. High porosity increases thermal insulation by reducing the solid/air ratio, since the solid has higher thermal conductivity, suppressing convective heat transfer for pores smaller than <1 mm, and further decreasing thermal conductivity by the Knudsen effect when the pores are smaller than the mean free path of air (~80 nm in typical conditions). However, pores that are larger than 20 nm scatter visible light, which increases the haze and decreases the transparency of the material. For aerogels to be transparent, the pore size must be controlled. Transparency and low haze require small pores (<20 nm) and narrow pore size distribution.

In order to achieve transparent aerogels, the polymer forming the aerogel structure must be transparent and colorless. Vinyl polymers are some of the most transparent polymer materials known today. For example, poly-methylmethacrylates and other acrylate derivatives have been used for fabrication of acrylic windows, for highly transparent optical adhesives, and for interlayers in laminated glazings. Therefore, they would be the ideal candidates for producing transparent aerogels. In addition to transparency they also are amenable to processes that enable <20 nm and narrow pore size distribution. However, the use of common acrylic monomers resulted in aerogels with poor porosity as indicated by BET area <50 m2/g. The capillary pressure induced aerogel shrinking becomes larger as the pore size of the aerogel decreases.

If available, transparent all-polymer aerogels would be useful as transparent insulation that could for example be used for highly insulating windows. Various windowpanes could be fabricated, including windowpanes that have dimensions identical to single pane windows, which would enable a new retrofit or replacement of single pane windows.

Reducing the heat loss through existing single pane windows could potentially lower US energy consumption by 1.3%. Currently, the heat loss through single pane windows is reduced by replacing them with double, triple, or quadruple pane windows, or insulated glass units (IGUs), which can incorporate inert gas insulation and, or low emissivity coatings. While IGUs are effective at reducing heat loss, they suffer several drawbacks such as high cost ($50-100/ft2) due to the replacement of the window framing and sash, high weight, and unaesthetic appearance which may be an important attribute for historic buildings. Other applications and markets where high transparency, highly insulating single panes are potentially valuable include commercial refrigeration, automotive glazings, and electronic displays.

Thus, there is a need for a method and materials to produce high surface area BET >100 m2/g air dried polymer aerogels by preventing the aerogel collapsing during solvent evaporation and solvent exchange steps during ambient environment solvent drying. Furthermore, there is a need for producing such aerogels that are transparent.

DETAILED DESCRIPTION OF THE EMBODIMENTS

Transparent aerogels in the present disclosure are fabricated by radical polymerization of monomers and cross-linkers, in solvents, radical initiators and in the presence of chain transfer agents (CTA). For the purpose of this application monomers and cross-linker molecules contain reactive, i.e. polymerizable functional groups that form polymer chains by chain-growth polymerization in the presence of radical initiators. The difference between monomers and cross-linkers consists in the number of polymerizable groups. For the purpose of this application, monomers contain one or two polymerizing groups while cross-linkers possess three or more polymerizing groups. Suitable monomers include monomers containing polymerizable double bonds including acrylates, methacrylates or vinyl monomers. The chain transfer agent is added to produce aerogels with small size pores. As mentioned before, aerogels produced by conventional radical polymerization of monomers and crosslinkers have a large range of pore sizes, including some that are very large. Gelation occurs early in the reaction, creating a barrier for reactant diffusion and resulting in a large pore size distribution. This results in hazy and often white, opaque gels, i.e. with very limited or no transparency.

When present in the aerogel precursor formulation the CTA limits the chain growth and initiate new chain formation within crosslinked structure, which results in mechanically robust gels with small pores, low-haze, and high optical transparency. The CTA also slows the gelation and precipitation of the growing polymer, resulting in materials with more uniform pore structure.

Figure 1A:
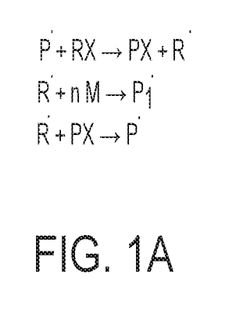
FIG. 1A illustrates an exemplary mechanism of chain transfer.
Figure 1B:
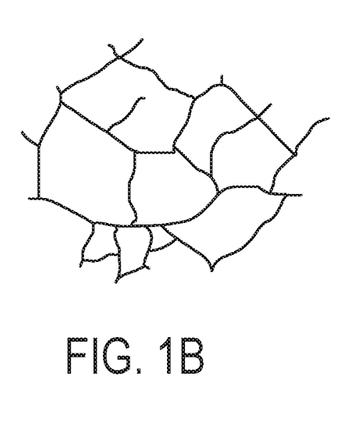
FIG. 1B illustrates an example of obtaining large pores by radical polymerization.
Figure 1C:
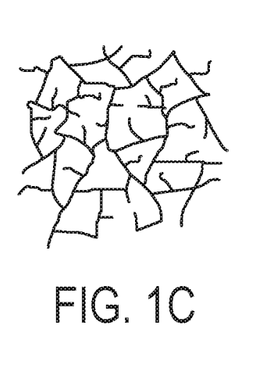
FIG. 1C illustrates an example of obtaining small pores by adding chain transfer agents (CTAs).

Smaller pore size can be achieved by decreasing the length of the polymer chains in the crosslinked aerogel structure, as illustrated by FIGS. 1A-C. Using a chain transfer agent (CTA) in the radical polymerization is critical for producing polymer gels with low haze and small pore size.

As used herein, the term chain transfer agents generally refers to molecules that have at least one weak chemical bond. They generally react with the free-radical site of a growing polymer chain and interrupt chain growth. In the process of chain transfer, the radical is temporarily transferred to the regulating agent, which reinitiates growth by transferring the radical to another polymer or monomer. An example of this is illustrated by FIG. 1A. The CTA generally controls the chain length during synthesis, delays gelation, and also gives more uniform gels.

FIG. 1A illustrates an exemplary mechanism of chain transfer. A growing polymer chain, P., reacts with a chain transfer agent, RX, to form a terminated chain, PX, and a new initiating radical, R., which activates either a monomer or a polymer chain. When employed in a precursor formulation that contains at least one precursor that has more than one polymerizable group (either a di-functional monomer or a crosslinker with three or more polymerizable groups), the polymerization produces a crosslinked gel structure wherein the individual polymer chain segments are smaller when compared with polymer chains that may be obtained in the absence of the CTA. As a result, shorter polymer chains produce aerogel with smaller pores, therefore aerogels with increased transparency. FIG. 1B illustrates an example of obtaining large pores by radical polymerization. FIG. 1C illustrates an example of obtaining small pores by adding chain transfer agents (CTAs).

Figure 2A:
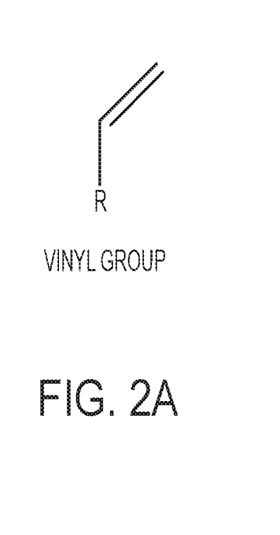
FIG. 2A illustrates an example of a vinyl functional group that may undergo radical polymerization.
Figure 2B:
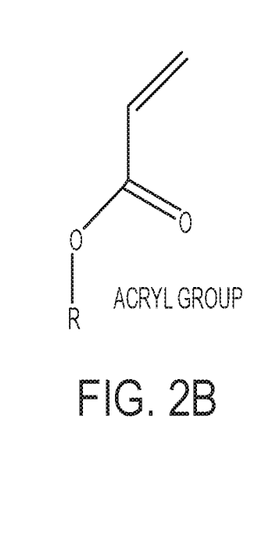
FIG. 2B illustrates an example of an acryl functional group that may undergo radical polymerization.
Figure 2C:
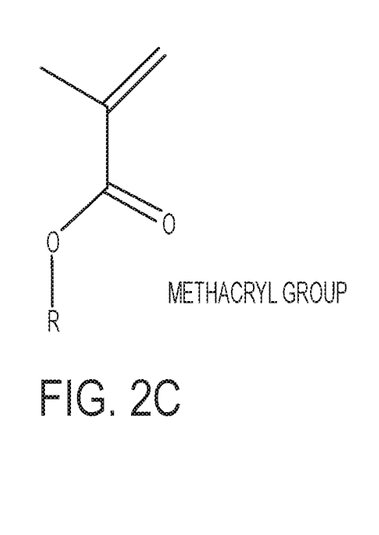
FIG. 2C illustrates an example of a methacryl functional group that may undergo radical polymerization.
Figures 3A, 3B, 3C:
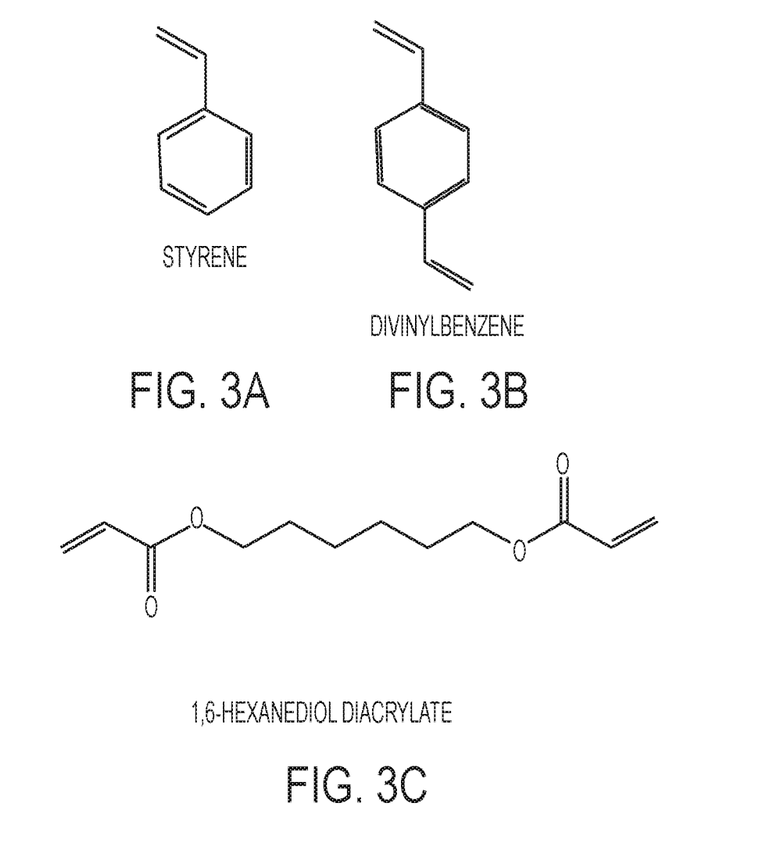
FIG. 3A illustrates an example of styrene.
FIG. 3B illustrates an example of divinylbenzene.
FIG. 3C illustrates an example of 1,6-hexanediol diacrylate.
Figure 3D:
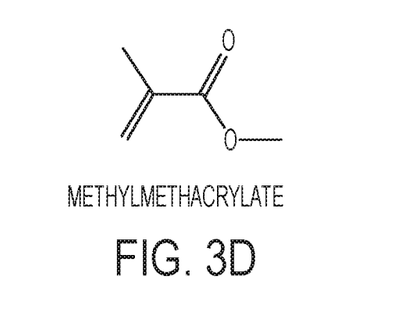
FIG. 3D illustrates an example of methyl methacrylate.
Figure 4A:
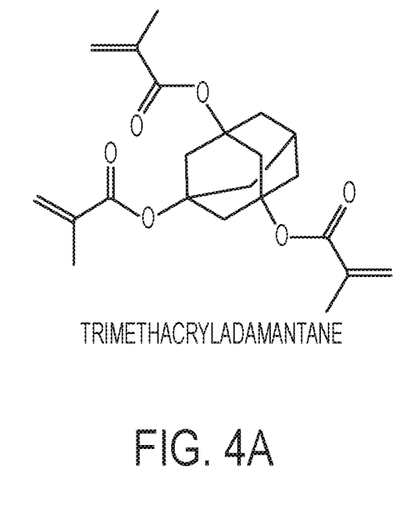
FIG. 4A illustrates an example of 1,3,5-trimethacryloyloxy adamantane.
Figure 4B:
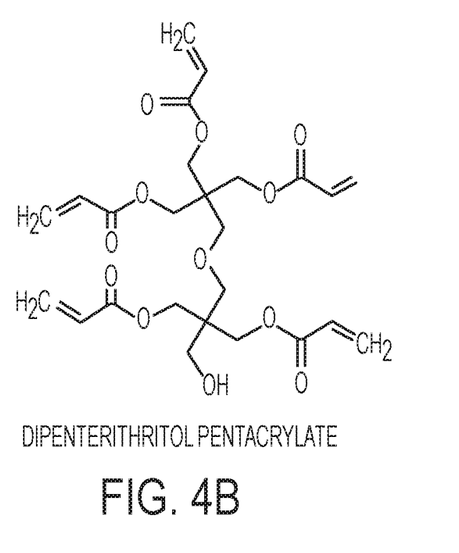
FIG. 4B illustrates an example of dipenterithritol pentacrylate.
Figure 4C:
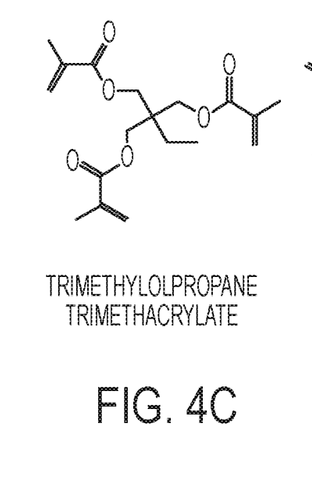
FIG. 4C illustrates an example of trimethylolpropane trimethacrylate.
Figure 4D:
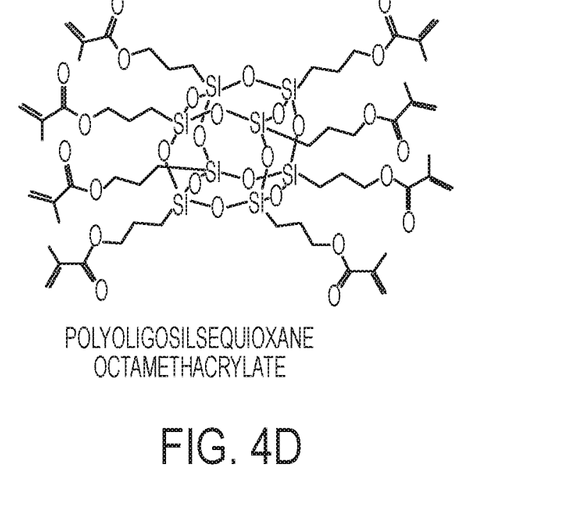
FIG. 4D illustrates an example of polyoligosilsequioxane-octamethacrylate.
Figure 5A:
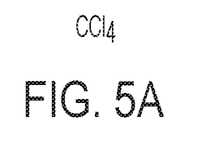
FIG. 5A illustrates an example of carbon tetrachloride.
Figure 5B:
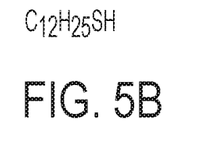
FIG. 5B illustrates an example of dodecanethiol.
Figure 5C:
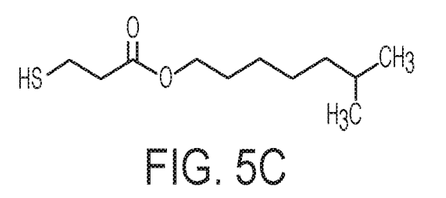
FIG. 5C illustrates an example of Isooctyl 3-mercaptopropionate.
Figure 5D:
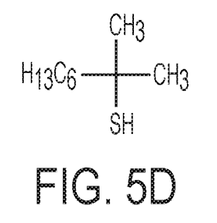
FIG. 5D illustrates an example of tert-nonyl mercaptan.
Figure 5E:
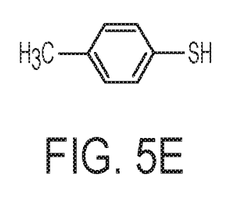
FIG. 5E illustrates an example of 4-methylbenzenethiol.
Figure 5F:
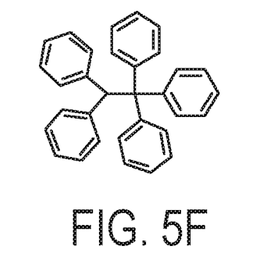
FIG. 5F illustrates an example of pentaphenylethane.

Certain implementations of the disclosed technology include synthesizing polymer gels in solvent from chain transfer agents, mono- or di-functional monomers, and multifunctional cross-linkers, where the functional groups of the monomers and cross-linkers can undergo radical polymerization. Such functional groups include vinyl, acrylate, and methacrylate groups, as illustrated respectively by FIGS. 2A-C.

Examples of suitable acrylates and methacrylates include (a) monofunctional acrylates and methacrylates such as methyl acrylate, ethyl acrylate, methyl methacrylate, ethyl methacrylate, benzyl methacrylate, lauryl methacrylate, isobornyl methacrylate (b) difunctional acrylates and methacrylates such as 1,3-Butanediol diacrylate, 1,6-hexanediol diacrylate, bisphenol A ethoxylate diacrylate, ethylene glycol diacrylate, poly(ethylene glycol) diacrylate. Suitable vinyl monomers include styrene, divinylbenzene and liquid ethylene derivatives such as, vinyl stearate, vinyl laurate, vinyl benzoate, vinyl acetate, ethyl vinyl ether, vinyl chloride, 1-Vinyl-2-pyrrolidone. Chemical formulas for some of these monomers are provided in FIGS. 3A-D. More particularly, FIGS. 3A-D illustrate examples of styrene, divinylbenzene, 1,6-hexanediol diacrylate, and methyl methacrylate, respectively.

Suitable cross-linkers include tri, tetra, penta or hexaacrylates and methacrylates such as trimethylolpropane triacrylate, trimethylolpropane ethoxylate triacrylate, di(trimethylolpropane) tetraacrylate, dipentaerythritol penta-/hexaacrylate and the like. FIGS. 4A-D illustrate examples of 1,3,5-trimethacryloyloxy adamantane, dipenterithritol pentacrylate, trimethylolpropane trimethacrylate, and polyoligosilsequioxane-octamethacrylate, respectively.

FIGS. 5A-F illustrate various examples of radical chain transfer agents that contain a bond that can undergo homolytic cleavage, such as organic molecules containing halogen or thiol groups. More particularly, FIGS. 5A-F illustrate examples of carbon tetrachloride, dodecanethiol, Isooctyl 3-mercaptopropionate, tert-nonyl mercaptan, 4-methylbenzenethiol, and pentaphenylethane, respectively.

In certain embodiments, gel precursors may be dissolved in a solvent which acts as a template to create the solvent-filled voids in the gel structure during polymerization, that become pores after solvent removal, Suitable solvents provide good solubility to the reactive monomers. Particularly suitable are polar aprotic organic solvents such as dimethylformamide, methyl ethyl ketone, toluene, tetrahydrofuran, diethyl ether, diglyme (diethylene glycol dimethyl ether), 1,2-dimethoxy-ethane, ethyl acetate, xylene and others. Particularly suitable are high boiling solvents such as acetophenone or n-methylpyrrolidone.

Figure 6A:
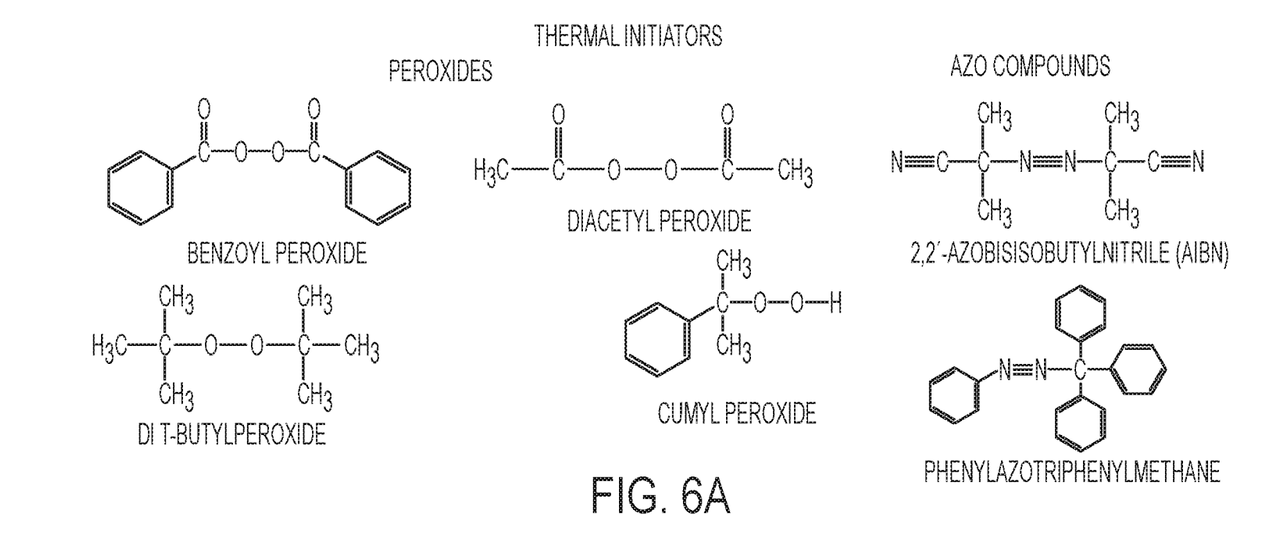
FIG. 6A illustrates examples of thermal initiators
Figure 6B:
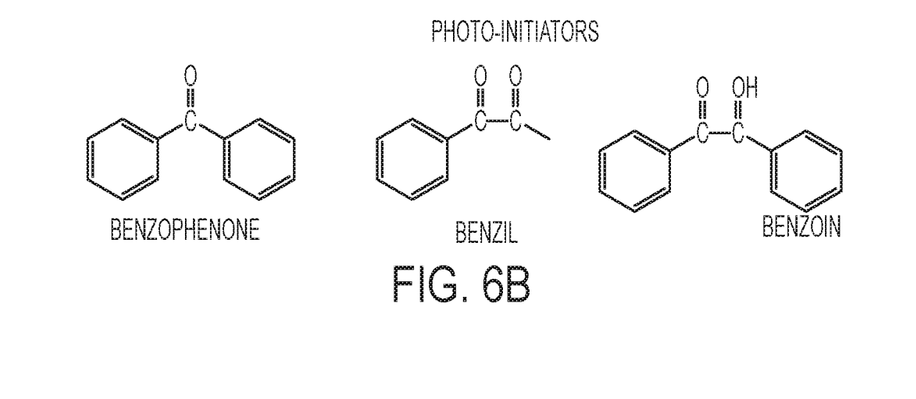
FIG. 6B illustrates examples of photo-initiators

Suitable radical initiators include thermal initiators—activated by heat—and photoinitiators which are activated by light, typically Ultra Violet in a range of about 200 nm to 400 nm wavelength. Non-limiting examples of thermal initiators includes (a) peroxides such as benzoyl peroxide, diacetylperoxide, di t-butylperoxide, cumyl peroxide; or azo compounds such as AIBN and Phenylazotriphenylmethane. Non-limiting examples of photoinitiators include benzophenone, benzyl, benzoin and the like. Chemical formulas for some of these examples of initiators are provided in FIG. 6A-B.

Figure 9:
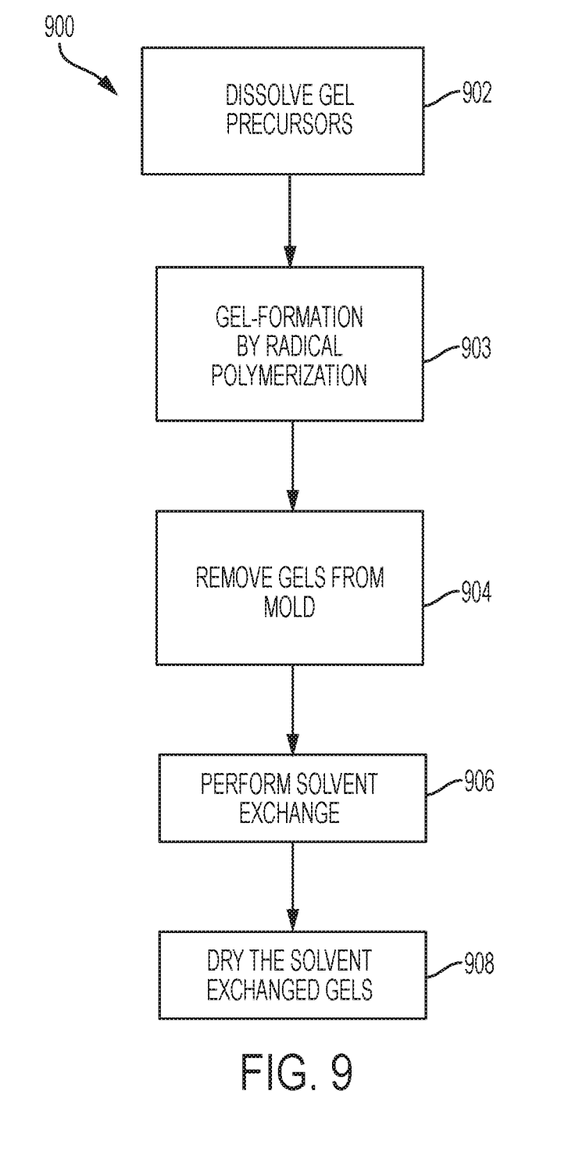
FIG. 9 illustrates an example of a method of forming transparent polymer aerogels using chain transfer agents (CTAs) in accordance with implementations of the disclosed technology.

FIG. 9 illustrates an example of a method 900 of forming transparent polymer aerogels using chain transfer agents (CTAs) in accordance with implementations of the disclosed technology.

At 902, gel precursors are dissolved, e.g., in a high boiling point solvent, and then deoxygenated, e.g., with dry $N_2$. At 903, the deoxygenated solution is placed in a mold and is polymerized by activating radical initiators either by heating or by UV light. At 904, the gels are removed from the mold.

At 906, solvent exchange is performed. For example, the gels may be solvent exchanged in a solvent to extract any oligomers, and then exchanged into a solvent with low solvent-polymer interaction strength. At 908, the solvent exchanged gels are dried using ambient or supercritical $CO_2$ drying, for example.

A typical gel precursor formulation consists of a chain transfer agent, dodecanethiol, a thermal radical initiator, azobisisobutyronitrile (AIBN), a monomer, divinylbenzene, and a crosslinker, trimethacryladamantane.

In these embodiments, the composition of polymerizable material as compared to solvent may range from about 5% to about 70% by mass. The ratio of chain transfer agent to radical initiator varies within a range comprised from 0.1:1 to about 10:1 by mass. The initiator concentration is comprised in a range from about $10^{-6}$ mol to about $10^-$ mol per gram of polymerizable precursors. The degassed solution was cast into a mold and polymerized at a temperature comprised in a range from about 50° C. to about 150° C. for approximately 1-20 hours. When AIBN is used as initiator, the preferred polymerizing temperature was 90° C. Other initiators may require higher or lower reaction temperature.

In these embodiments, gels in solution that contained CTA appear less hazy than those that do not contain CTA. The time required for gelation to occur is generally longer for gels synthesized with CTA. This delayed gelation may contribute to the improved optical properties because, for example, the pore size is more uniform due to the growing polymer chains remaining in solution longer.

The gels may be removed from the mold and solvent exchanged before subsequent drying steps. The gels may be first solvent exchanged into a good solvent, such as the polymerization solvent (e.g. acetophenone, n-methylpyrrolidone or dimethylformamide and other) or other good solvents such as tetrahydrofuran (THF), e.g., to extract any oligomers, and then exchanged into a solvent with low solvent-polymer interaction strength, such as acetone or heptanes, before drying.

In certain embodiments, static or flow solvent exchange can be used. In static solvent exchange process, the wet gel is placed in the selected solvent for 1 day or more and two exchanges may be performed for each type of solvent. Solvent may be introduced directly, or gradually. For example, a gel solvated by THF can be directly immersed into acetone, or first immersed in a 50/50 mixture of THF/acetone for 1 day, and then immersed in 100% acetone. In flow solvent exchange, a fixed amount of solvent may be pumped across the wet gel for 6 to 72 hours, for example. Generally, with smaller pore size the duration of solvent exchange step needs to be increased, to ensure complete solvent exchange, since smaller pores make it more difficult for the solvents to diffuse through the pore network.

Aerogels may be produced by drying the solvent exchanged gels. Ambient, supercritical $CO_2$ drying, or freeze-drying can be used, for example. In ambient drying, a gel immersed in a non-solvent such as heptane may be slowly dried, e.g., over 2-3 days, in a covered container and then dried under a vacuum at a temperature comprised in a range from the room temperature up to an elevated temperature, e.g., 90° C. In supercritical CO$_2$ drying, gels in a non-solvent, such as acetone, or an alcohol may be solvent exchanged with liquid CO$_2$ and subsequently supercritically dried. In freeze drying, the solvated gel is frozen, and the solidified solvent (ie. water, benzene or cyclohexanol) is sublimated at suitable temperatures and pressures (eg. −50° C., under vacuum for water). The highest porosities may be generally achieved with supercritical CO$_2$ drying.

For window insulation applications, materials having high transparency, low haze, and maximal porosity are generally desired, though low haze and high porosity tend to be difficult to achieve simultaneously.

The addition of CTA advantageously enables the synthesis of aerogels with smaller pore size and narrower pore size distribution, characteristics that improve the optical transparency and haze for window applications. Generally, transparent and reduced haze aerogels have a very small fraction of pores (typically below 5%) of a size larger than 30 nm. This feature is essential for transparent aerogels.

Example 1: Fabrication of an Aerogel Using CTA

An aerogel with CTA is synthesized by dissolving in 1.4 g n-methyl pyrrolidone: 0.54 g divinyl benzene monomer, 0.06 g trimethacryladamantane crosslinker, 0.01 g azobisisobutyronitrile (AIBN) radical initiator, and 0.02 g dodecanethiol CTA. The solution is sparged with dry N$_2$ gas for 15 min, and then reacted at 90° C. for 1 hour. The wet gel is then demolded and solvent exchanged, twice in THF, and twice in heptanes. For each solvent exchange step, the gel is soaked in a 10 mL bath of solvent for 24 hr. Aerogels are produced by drying the wet gels slowly, under ambient conditions. The wet gels are placed in a jar with a small hole in the lid, and solvent is evaporated over 4 days. After 4 days, the lid is removed, and the aerogel is vacuum dried for 12 hr at 90° C. to remove any residual solvent.

Example 2: Counter Example: Fabrication of an Aerogel without a CTA

The aerogel without CTA is fabricated as above, except that the precursors dissolved in 1.4 g of n-methylpyrrolidone are: 0.54 g divinyl benzene monomer, 0.06 g trimethacryladamantane crosslinker, and 0.01 g azobisisobutyronitrile (AIBN) radical initiator.

Example 3: Porosity Characterization

The pore properties, e.g., pore size and porosity characterization, measured by N$_2$ adsorption porosimetry of an exemplary aerogel that was synthesized with and without CTA are summarized in Table 1 below. The width of the pore size distribution is described by the full width at half maximum, or FWHM.

TABLE 1

|  | CTA | No CTA |
| --- | --- | --- |
| Ave pore size (nm) | 4 | 16 |
| FWHM pore size distribution (nm) | 6 | 24 |
| Porosity (%) | 41 | 57 |
| BET surface area m$^2$/g | 686 | 823 |

Porosity is generally estimated by comparing the apparent density of the aerogel to the bulk density of the constituent polymers. FIG. 6 is a graphical example illustrating the pore size distribution for the samples in Table 1. As can be seen from the illustrated example, the width of the distribution (FWHM) and the average pore size are both lower for the sample that was synthesized with CTA. In particular a very small fraction of pores has a pore size >30 nm.

Example 4: Optical Characterization

Figure 7:
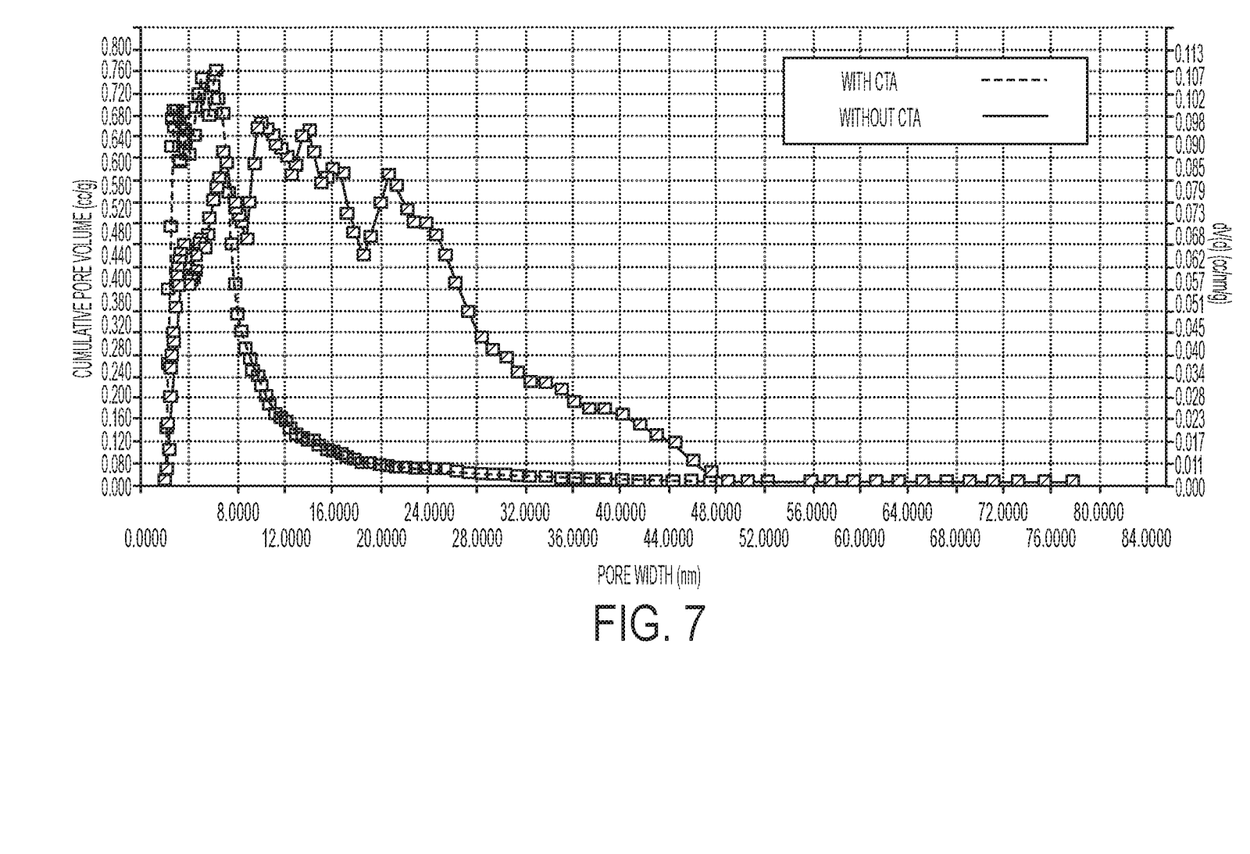
FIG. 7 is a graphical example illustrating pore size distributions for aerogels synthesized with and without CTA.
Figure 8:
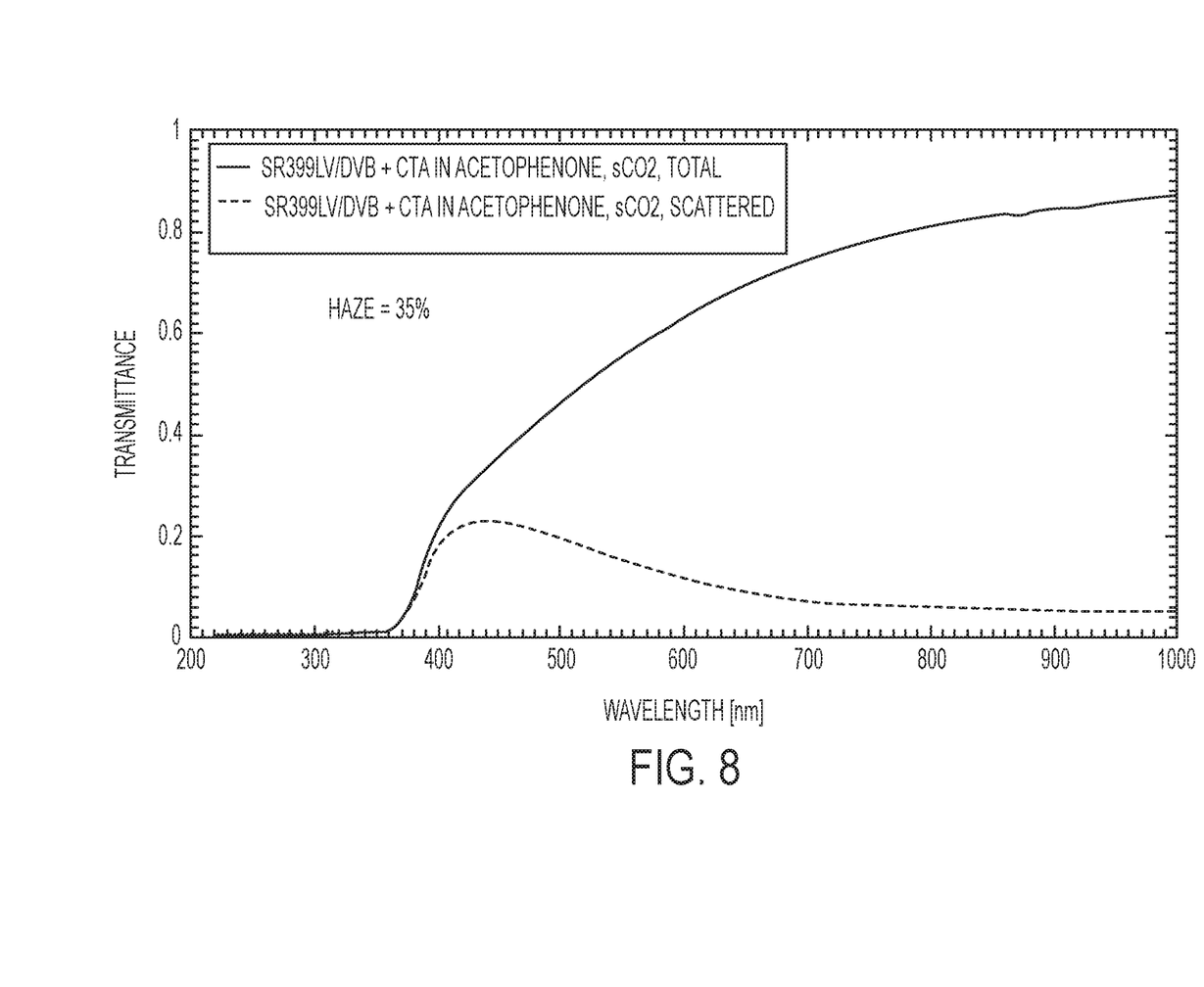
FIG. 8 is a graphical example illustrating the transmission and haze for an aerogel synthesized with CTA.

FIG. 7 is a graphical example illustrating the optical properties of an aerogel that is synthesized with CTA. Such optical properties may be measured by UV-vis spectrometry. Samples synthesized without CTA are generally too opaque to measure significant optical light transmission (e.g., transmission ~0).

Implementations of the disclosed technology advantageously enables the production of materials having low thermal conductivity, high transparency in the visible spectrum, and low haze, thus making them suitable for single pane window insulation.

Aerogel formulations containing CTA in accordance with embodiments of the disclosed technology generally have greatly improved optical transparency compared to those without.

Aerogel formulations with CTA in accordance with embodiments of the disclosed technology generally have smaller pore size and narrower pore size distribution compared to those without, thus making the aerogel transparent.

The use of CTA advantageously enables the production of polymer-based transparent aerogels, which are more hydrophobic than conventional silica aerogels and do not require post-processing.

A high BET surface area may be obtained in transparent materials in accordance with the disclosed technology.

Implementations of the disclosed technology advantageously provide the ability to produce an insulation material that is suitable for a single pane window retrofit.

However, with conventional acrylate monomers, the overall BET surface areas and total cumulative pore volume as measured by nitrogen gas sorption is generally very low and show significant shrinking, i.e. aerogel polymer network collapsing during solvent evaporation.

We believe that stiffer polymer walls would resist more successfully the strong capillary forces between polymer chains and solvent that are responsible for collapsing the aerogels we made so far, when drying under ambient conditions. The Young Modulus is typically used as a measure of the stiffness of a polymer material.

Based on experimentation, we discovered design rules for aerogel precursors that reduced significantly the shrinking, therefore producing higher surface area polymer aerogels.

Certain implementations include an aerogel that is the result of radical polymerization of organic vinyl monomers (molecules including one or two vinyl groups) and vinyl crosslinkers (molecules with three or more vinyl groups) in a solvent, wherein at least one of the monomers or crosslinkers is present in a concentration >80% (of total monomers & cross-linker materials) and is selected according to the following criterion: the corresponding homopolymer resulted from the polymerization of the monomer or crosslinker has a Young modulus 3.5 GPa.

Table 2 shows BET area, cumulative pore volume, and shrinkage of different polymer aerogel formulations containing difunctional monomer with various Young modulus and cross-linkers. Samples were dried in ambient conditions.

| Cross-linker | Young modulus of corresponding homopolymer [GPa] | Monomer | Young Modulus of corresponding homopolymer [GPa] | BET area [m$^2$/g] | Cumulative pore volume [cm$^3$/g] |
|---|---|---|---|---|---|
| SR399LV (20%) | 3.5 | 104Z (80%) | 2.2 | 2 | 0.0020 |
| SR399LV (10%) | 3.5 | HDDA (90%) | 0.9 | 4 | Not measured |
| SR399LV (50%) | 3.5 | HDDA (50%) | 0.9 | 8 | Not measured |
| SR399LV (70%) | 3.5 | HDDA (30%) | 0.9 | 14 | Not measured |
| SR399LV (80%) | 3.5 | HDDA (20%) | 0.9 | 246 | 0.30 |
| SR399LV (10%) | 3.5 | DVB (90%) | 5.2 | 797 | 2.02 |
| TMAA (10%) | 3.8 | DVB (90%) | 5.2 | 879 | 2.2 |

Aerogels made from monomers that produce corresponding homo-polymers with a Young modulus ≥3.5 GPa possess high surface area >700 m$^2$/g.

Figure 10:
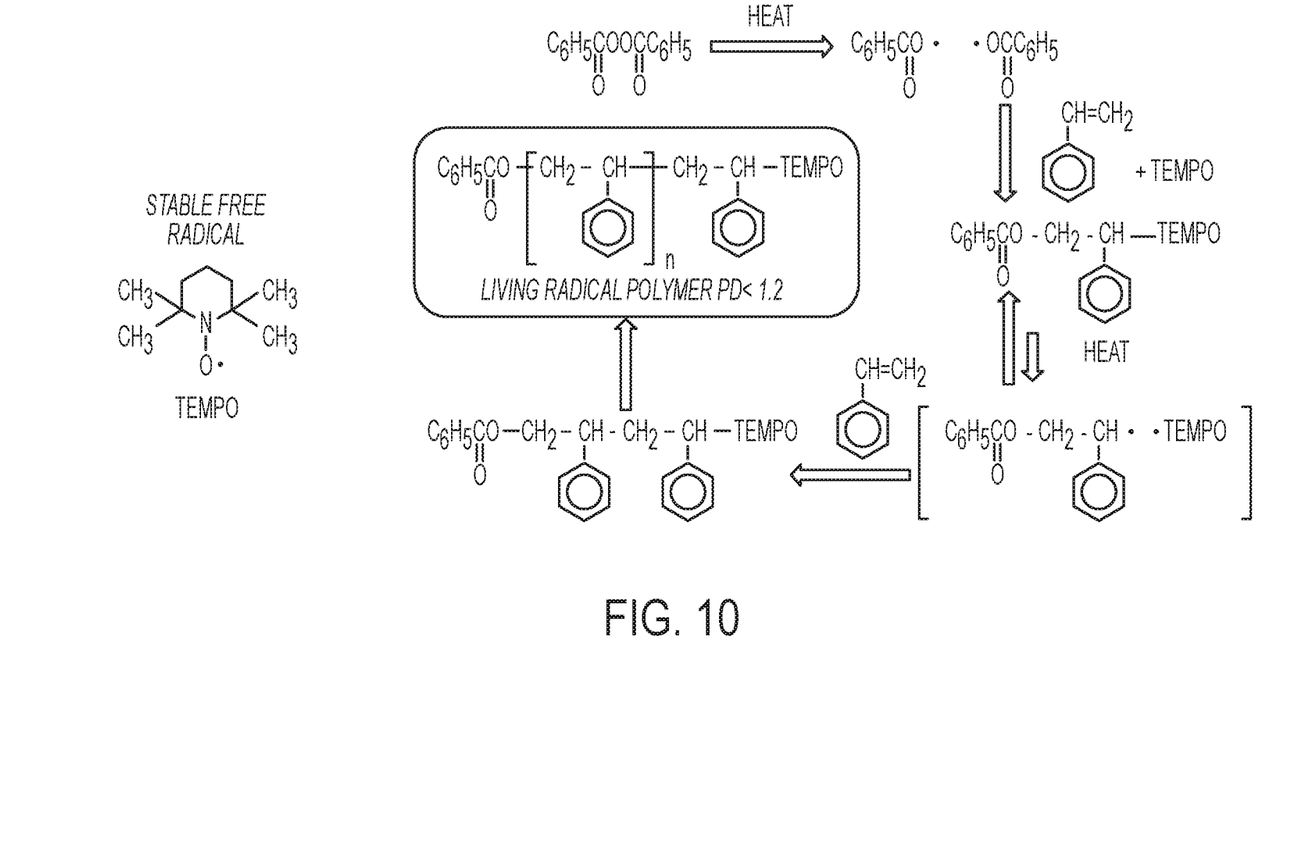
FIG. 10 illustrates an exemplary mechanism of the Stable Free Radical Polymerization (SFRP) process for fabrication of polymers with narrow polydispersity (e.g., PD <1.2) in accordance with certain implementations of the disclosed technology.

FIG. 10 illustrates an exemplary mechanism of the Stable Free Radical Polymerization (SFRP) process for fabrication of polymers with narrow polydispersity (e.g., PD <1.2) in accordance with certain implementations of the disclosed technology. In the example, an enabler is the addition of a stable free radical (i.e., TEMPO) which reversibly caps the growing radical polymer chain. This slows down the overall polymerization rate, prevents undesired fast polymerization in hot spots, and enables uniform growth of all the polymer chains at the same rate. As a result, the SFRP process has been shown to produce linear polymers with polymer size distribution PD <1.2. For comparison, uncontrolled polymerization typically produces polymers with PD >2.5.

A key feature of this example is the adaptation of the process to (a) aerogel fabrication, (b) multifunctional monomers and cross-linkers, i.e. fabrication of cross-linked polymer structures instead of just linear polymer chains as demonstrated previously, and (c) multifunctional monomers and cross-linkers that produce high stiffness polymers.

In the example, a stable free nitroxide (TEMPO) was added at a concentration of about 10$^{-4}$ mol TEMPO per gram of polymerizable precursors. AIBN was added at a ratio of AIBN:TEMPO of around 1:1 by mass. Polymerization was carried out at 125 degrees C. for 16-24 hr. Optionally, a reducing agent such as hydroxyacetone may be added to speed the kinetics. Typically, the molar equivalent of reducing agent to TEMPO is between 1:10 and 10:1.

Figure 11:
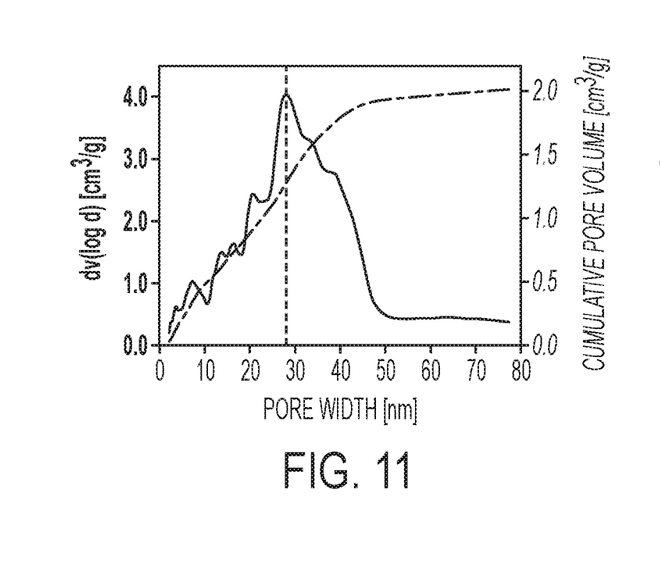
FIG. 11 illustrates a conventional radical polymerization, i.e. without pore size control additive as obtained by the general process (as compared to controlled).
Figure 12:
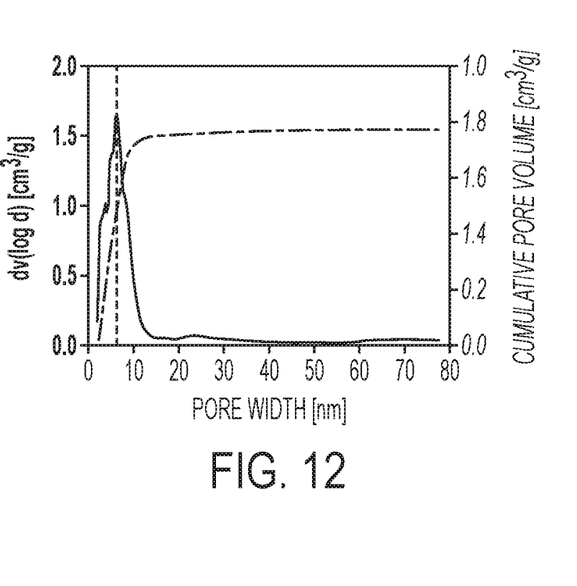
FIG. 12 illustrates an example of a living radical polymerization (i.e., SFRP) in accordance with certain implementations of the disclosed technology.

Certain implementations include a transparent polymer aerogel through SFRP with a BET area comparable with that achieved by conventional radical polymerization. The pore size distribution and appearance of the two samples are compared via FIGS. 11 and 12. The sample produced with SFRP has an average pore size smaller than 10 nm and a narrower pore size distribution compared with the same formulation produced by conventional radical polymerization. This difference leads to higher transparency of the sample.

Certain implementations of the disclosed technology advantageously enable the production of polymer aerogels with a high BET (e.g., >100 m2/g) by ambient drying instead of supercritical CO$_2$ drying. These implementations have a lower cost than the supercritical drying process. Certain implementations include the use of methods for controlled radical polymerization processes (e.g., SFRP, CTA and other) to produce a high BET surface area (e.g., approaching 900 m2/g).

Certain implementations advantageously enable both large pore (e.g., opaque) aerogels as well as transparent and/or translucent aerogels by ambient drying.

Certain implementations include the use of monomers and cross-linkers that produce stiff polymer chains (e.g., as characterized by the Young modulus 3.5 GPa of the corresponding polymers).

Certain implementations may include a method of producing a transparent polymer aerogel, the method including: dissolving gel precursors consisting of radical polymerizable monomers and crosslinkers, radical initiators, and a chain transfer agent (CTA) in a reaction solvent; placing the gel precursors into a substrate; polymerizing the gel in the substrate; and drying the gel. Such methods may further include applying the dried gel to a transparent substrate, such as glass. Alternatively or in addition thereto, such methods may include the monomer being divinyl benzene or 1,6-hexanediol diacrylate, the crosslinker being 1,3,5-trimethacryloyloxy adamantane or dipentaerythritol pentaacrylate, the solvent being acetophenone or n-methylpyrrolidone, the thermal radical initiator being benzoyl peroxide or 2,2'-azobis(2-methylpropionitrile), the chain transfer agent being dodecanethiol, the polymerization being performed by heating at a temperature in a range from 80-120° C., at least one solvent exchange being performed with tetrahydrofuran with heptane, e.g., in this order, and wherein the gel is air dried.

Certain implementations may include a transparent polymer aerogel produced by a method disclosed herein. Such an aerogel may have a BET surface area higher than 100 m$^2$/g and/or a visible transmittance higher than 30% and a haze lower than 30% for a sample 3 mm thick or greater, or transmittance higher than 10% per mm of sample, or haze lower than 10% per mm of sample for samples thinner than 3 mm. Such an aerogel may have less than 5% pores of a size larger than 30 nm. Such an aerogel may have a thermal conductivity lower than 150 mW/mK.

Certain implementations may include a window having: at least one pane; and a high-transparency polymer gel applied to the at least one pane, the gel having been synthesized by radical polymerization of crosslinkers and monomers in the presence of a chain transfer agent (CTA).

Certain implementations may include a method of fabricating a transparent or translucent aerogel, the method comprising: performing radical polymerization of organic vinyl monomers and vinyl cross-linkers in a solvent, wherein at least one of the vinyl monomers and/or cross-linkers is present in a concentration greater than 80% of total vinyl monomers & vinyl cross-linkers and is selected based on a corresponding homo-polymer resulting from the polymerization of the monomer and/or cross-linker having a Young modulus of at least 3.5 GPa. Such methods may further include synthesizing by controlled radical polymerization processes to produce small and narrow size distribution pores. The radical polymerization processes may be selected from a group consisting of the following: stable free radical polymerization (SFRP), atom radical transfer polymerization (ATRP), and using a Chain transfer agent (CTA). Such an aerogel may have visible transmittance higher than 30% and a haze lower than 30% for a sample 3 mm thick or greater, or transmittance higher than 10% per mm of sample, or haze lower than 10% per mm of sample for samples thinner than 3 mm. Such aerogels may have a BET greater than 100 $m^2/g$, and/or an average pore size lower than 20 nm and a narrow pore size distribution, and/or a full width at half maximum (FWHM) pore size distribution less than 10 nm.

Certain implementations may include a window having: at least one pane; and a high-transparency polymer gel applied to the at least one pane, the gel having been synthesized by radical polymerization of organic vinyl monomers and vinyl cross-linkers in a solvent.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method of producing a polymer aerogel, the method comprising:
    dissolving gel precursors including radical polymerizable monomers and crosslinkers, radical initiators, and a chain transfer agent (CTA) in a reaction solvent, wherein the chain transfer agent is selected from a group consisting of: an organic thiol, dodecanethiol, carbon tetrachloride, and pentaphenylethane;
    polymerizing the gel precursors to form a gel; and
    drying the gel.

2. The method of claim 1, wherein the reaction solvent is a polar, aprotic, organic solvent.

3. The method of claim 2, wherein the polar, aprotic organic solvent is selected from a group consisting of: acetophenone, dimethylformamide, and n-methylpyrrolidone.

4. The method of claim 1, wherein the radical initiators are selected from a group consisting of: organic peroxides and organic azo compounds.

5. The method of claim 1, wherein the radical initiators are selected from a group consisting of: a UV radical initiator and a radical photoinitiator.

6. The method of claim 1, wherein a concentration of the gel precursors in the reaction solvent in the precursor formulation is within a range from 5% to 70% by mass.

7. The method of claim 1, wherein the radical polymerizable monomers are selected from a group consisting of: mono and difunctional acrylates, methacrylates and vinyl monomers.

8. The method of claim 1, wherein the crosslinkers are selected from a group consisting of: tri, tetra, penta or hexa functional acrylates, methacrylates and vinyl monomers.

9. The method of claim 1, wherein polymerization is carried out by activating the radical initiators by heating and/or by exposure to light of an appropriate wavelength.

10. The method of claim 1, wherein polymerizing the gel precursors is performed on a substrate or a mold.

11. The method of claim 10, wherein the gel is removed from the substrate or the mold prior to drying.

12. The method of claim 1, wherein at least one solvent exchange is performed on the gel prior to drying.

13. The method of claim 12, wherein performing at least one solvent exchange includes performing static or flow solvent exchange.

14. The method of claim 12, wherein performing at least one solvent exchange includes exchanging the gel into a solvent suitable for extracting any oligomers.

15. The method of claim 14, wherein the solvent suitable for extracting any oligomers is selected from a group consisting of: acetophenone, dimethylformamide, n-methylpyrrolidone, and tetrahydrofuran (THF).

16. The method of claim 12, wherein performing at least one solvent exchange further includes exchanging the gel into a solvent having low solvent-polymer interaction strength, acetone, or heptanes.

17. The method of claim 1, wherein the aerogel is dried by air, by a supercritical $CO_2$ process, or by freeze-drying.

18. The method of claim 1, further comprising, after drying the gel to form an aerogel, applying the aerogel to a substrate.

19. The method of claim 17, wherein the polymer aerogel is transparent and has a transmittance higher than 10% per mm of sample thickness.

20. The method of claim 1, wherein the organic thiol contains organic molecules containing a halogen group and a thiol.

* * * * *